Dec. 7, 1954 L. E. GOUNER 2,696,377
ROASTING FURNACE
Filed March 28, 1951 6 Sheets-Sheet 1

INVENTOR
LEONIDAS E. GOUNER
BY Wilkinson + Mawhinney
ATTORNEYS

Dec. 7, 1954 L. E. GOUNER 2,696,377
ROASTING FURNACE
Filed March 28, 1951 6 Sheets-Sheet 2

INVENTOR
LEONIDAS E. GOUNER
BY Wilkinson & Mawhinney
ATTORNEYS

Dec. 7, 1954 L. E. GOUNER 2,696,377
ROASTING FURNACE
Filed March 28, 1951 6 Sheets-Sheet 3

INVENTOR
LEONIDAS E. GOUNER
BY Wilkinson + Mawhinney
ATTORNEYS Dec. 7, 1954   L. E. GOUNER   2,696,377
ROASTING FURNACE
Filed March 28, 1951   6 Sheets-Sheet 4

INVENTOR
LEONIDAS E. GOUNER
BY Wilkinson & Mawhinney
ATTORNEYS

Dec. 7, 1954 L. E. GOUNER 2,696,377
ROASTING FURNACE
Filed March 28, 1951 6 Sheets-Sheet 5

INVENTOR
LEONIDAS E. GOUNER

BY Wilkinson + Mawhinney
ATTORNEYS

INVENTOR
LEONIDAS E. GOUNER

BY Wilkinson & Mawhinney
ATTORNEYS

United States Patent Office 2,696,377
Patented Dec. 7, 1954

2,696,377

ROASTING FURNACE

Leonidas Everett Gouner, Gretna, La., assignor of one-eighth to Posey Ridgley Bowers and one-eighth to Richard Emmanuel St. Pe, both of New Orleans, La.

Application March 28, 1951, Serial No. 217,971

6 Claims. (Cl. 263—26)

The present invention relates to improvements in a roasting furnace and has for an object to provide an improved device of this kind in which is effected a uniform distribution of the material to be roasted throughout the entire interior area of the furnace so that the material will be subjected to all of the varying temperatures in the furnace during the passage of the material therethrough.

Another object of the present invention is to provide an improved roasting furnace which is substantially airtight so that the material being treated will not ignite and thereby be damaged or entirely destroyed.

A further object of the present invention is to provide an improved device of this character in which a series of rotating hearths are operatively associated with a series of stationary hearths; the rotating and stationary hearths being disposed in alternate relation to one another.

A still further object of the present invention is to provide an improved roasting furnace in which the material to be roasted is fed downwardly through the furnace from the hearth above to the hearth below alternately through a continuous passageway formed between the outer edge of the upper hearth and the outer wall of the furnace and a passageway disposed adjacent the inner edge of the next lower adjacent hearth and disposed substantially at the longitudinal center of the furnace.

The present invention aims to provide an improved device of this type in which the material supporting surfaces of the hearth are inclined downwardly towards their respective passageways and in which the hearth carry thereon scrapers or plows for engaging the material and assisting the movement of the material toward said passageways.

The present invention also aims to provide an improved structure in which the furnace is provided with a fluid cooling system which includes a hearth as a part thereof.

The present invention contemplates the provision of an improved roasting furnace in which the capacity per cubic volume of the furnace is increased and greater speed and economy are obtained in comparison with those of the prior art.

With the foregoing and other objects in view, the invention will be hereinafter more fully described and more particularly pointed out in the appended claims.

In the drawings, in which the same parts are denoted by the same reference numerals throughout the several views.

Referring more particularly to the drawings, 10 indicates the bottom of the furnace which may be made of steel or any other suitable material. The bottom 10 may be made of any desired size or shape but in the present illustration is shown to be substantially circular and has an upstanding substantially circular wall 11, to the lower end portion of which is secured, as by welding or the like, a connecting member 12.

The connecting member 12 may be of angle iron shape in cross-section, the vertical flange of which is secured to the outer face of the circular wall 11 and the horizontal flange is secured, as by welding or the like, to the horizontal flange of a similarly shaped member 13. The vertical flange of the member 13 is secured in any suitable manner to supporting legs 14 which may be in the form of columns made of steel or other appropriate material. The side wall of the furnace or oven may be made up of a plurality of substantially circular sections 15, 16, 17 and 18.

These sections may be made of steel or other suitable material and are fixed together by connecting members 19 which are similar in construction to the connecting members 12 and 13 and are joined together in a similar manner. The horizontal flanges of the members 19 may have aligned apertures for the reception of bolts for detachably securing the sections together. The wall 11 and the sections 15, 16, 17 and 18 may be lined with fire brick 20 or other refractory material which may be fixed to the inner faces of the wall 11 and the sections in any suitable manner. The upper surface of the bottom 10 may be lined with fire brick 21 or other refractory material.

A plurality of stationary hearths, generally indicated at A, are mounted within the furnace in spaced apart vertical relation. Each stationary hearth includes hollow rings 22, 23, 24 and 25 which are of progressively increased diameter from the center of the furnace towards the side wall thereof and are disposed in substantially concentric relation to one another and opened ended hollow bars 26. The opposite ends of the bars 26 are secured to adjacent rings and hold the rings in spaced apart relation at progressively higher elevations from the center of the furnace towards the side wall thereof and communicate with the interior of the rings to which they are attached. The bars 26 are arranged in radially extending angularly spaced apart rows as can be seen from Figure 13 of the drawings.

Each stationary hearth also includes a plurality of hollow spokes 27, each of which is disposed below and in vertical alignment with one of the radial rows of bars 26. Each spoke extends inwardly and upwardly and has its inner end joined to the innermost ring 22 and communicates with the interior thereof. The inner portion of each spoke 27 is secured to the lower face of its innermost bar 26. Braces 27a extend between and have their opposite ends secured as by welding or the like to the bars 26 and the spokes 27.

An annular header or manifold 28 is secured by welding or the like to the lower portion of the inner face of each section 15, 16, 17 and 18 and an annular header or manifold 29 is secured to an intermediate portion of the inner face of each section. The outer end of each spoke 27 of each stationary hearth A is secured to and communicates with its respective header 28 and the outermost bar 26 of each stationary hearth is secured to and communicates with its header 29.

One end of an L 30 is connected to each header 28 and one end of an L 31 is connected to each header 29. The other ends of the Ls 30 and 31 are connected by a tube 32 of rubber or other suitable material so that the adjacent headers 28 and 29 are connected together. The tubes 32 may be held tightly in place by clamping bands 32a.

A plurality of rotating hearths, generally indicated at B are positioned within the furnace, one of the rotating hearths being disposed within the space between each two adjacent stationary hearths. It will be noted from Figure 1 of the drawings that in the present illustration the lowermost hearth and the uppermost hearth are rotating hearths.

Each rotating hearth includes hollow rings 33, 34, 35 and 36 which are of progressively decreased diameter from the side wall of the furnace towards the center thereof and are disposed in substantially concentric relation to one another and opened ended hollow bars 37. The opposite ends of the bars 37 are secured at progressively higher elevations from the side wall of the furnace towards the center thereof and communicate with the interior of the rings to which they are attached. The bars 37 are arranged in radially extending angularly spaced apart rows as can be seen from Figure 13 of the drawings.

Each rotating hearth also includes a plurality of hollow spokes 38, each of which is disposed below and in vertical alignment with one of the radial rows of bars 37. Each spoke extends inwardly and downwardly and has its outer end joined to the outermost ring 33 and communicates with the interior thereof. The outer portion of each spoke 38 is secured to the lower face of its outermost bar 37. Braces 39 extend between and have their opposite ends secured as by welding or the like to the bars 37 and the spokes 38.

For the purpose of rotating the rotating hearths a driven shaft, generally indicated at C, is positioned within the furnace at substantially the center thereof. This shaft is made up of a plurality of sections 40, each of which has a through bore 41 which forms a continuous fluid passageway when the sections are secured together in vertically aligned position. Each section 40 is substantially twin spool shaped and has at is lower end a base 42 having angularly spaced apart threaded sockets for receiving screws 43 or the like which extend through suitable openings in the head 44 of the next lower section 40.

Suitable packing 45 is interposed between the base 42 and the head 44 of adjacent sections 40 of the shaft C to prevent leakage of the fluid from the bores 41 of the sections. The inner end of each spoke 38 of each rotating hearth is secured in a conduit 46 of the base 42 of one section 40 of the shaft and the inner end of each innermost bar 37 of each rotating hearth is secured in a conduit 47 formed in an intermediate enlarged portion 42a of the same section 40. The conduits 46 and 47 open into the bore 41 of the section 40.

Figure 1:
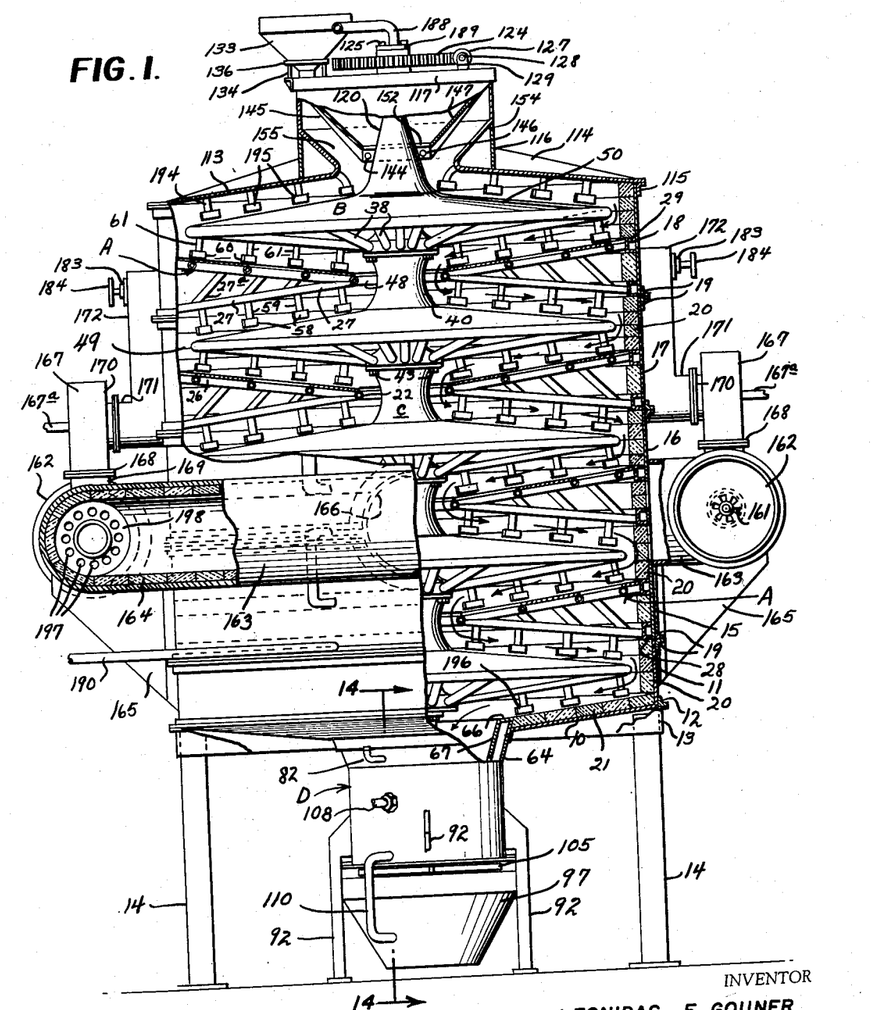
Figure 1 is a side elevational view of the improved device constructed in accordance with the present invention with parts broken away, with parts in section and with parts shown in diagrammatic form.
Figures 9, 10, 11, 12:
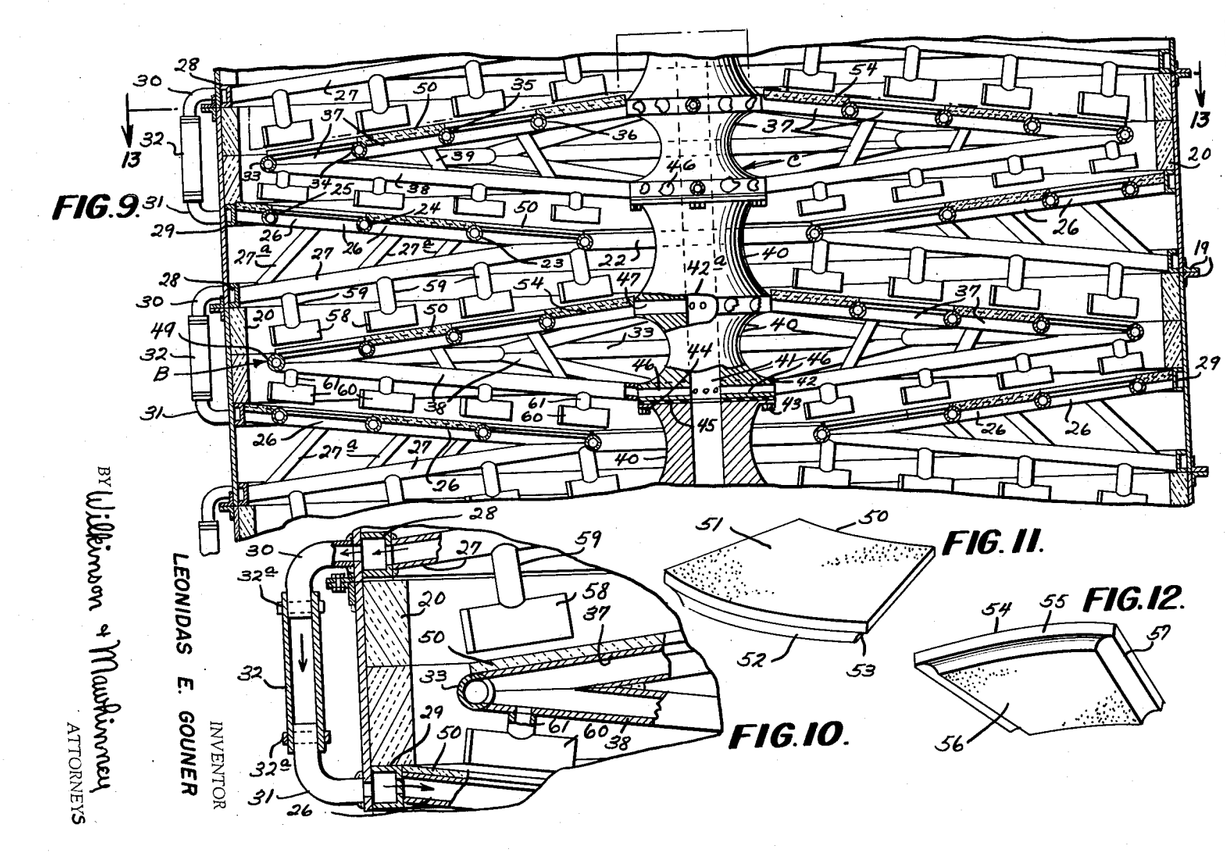
Figure 9 is an enlarged fragmentary vertical sectional view of the device taken at substantially the center thereof and illustrating sequential arrangement of the rotating and stationary hearths.
Figure 10 is an enlarged fragmentary sectional view of the piping means for connecting two adjacent stationary hearths.
Figure 11 is a top perspective view of one of the hearth plates.
Figure 12 is a bottom perspective view of another of the hearth plates.

It will be noted from Figures 1 and 9 of the drawings that the innermost ring 22 of each of the stationary hearths A surrounds the shaft C and is spaced therefrom to provide an uninterrupted annular passageway 48 therebetween. The outermost ring 33 of each rotating hearth B is spaced inwardly from the inner face of the fire brick 20 to provide therebetween an uninterrupted annular passageway 49.

Hearth plates 50 which may be made of steel, clay or any suitable refractory material are removably supported by the rings 22, 23, 24 and 25 and the bars 26 of the stationary hearth A and the rings 33, 34, 35 and 36 and the bars 37 of the rotating hearths B. The hearth plates 50 are substantially oblong but as can be seen from Figures 11 and 13 of the drawings each plate 50 tapers slightly longitudinally. Each plate 50 has an upper portion 51 and a lower portion 52. The lower portion 52 is of less length and width than the upper portion 51 to provide a downwardly facing shoulder 53 around the entire periphery of the plate 50 for resting upon the bars and rings of the hearths A and B.

Figure 13:
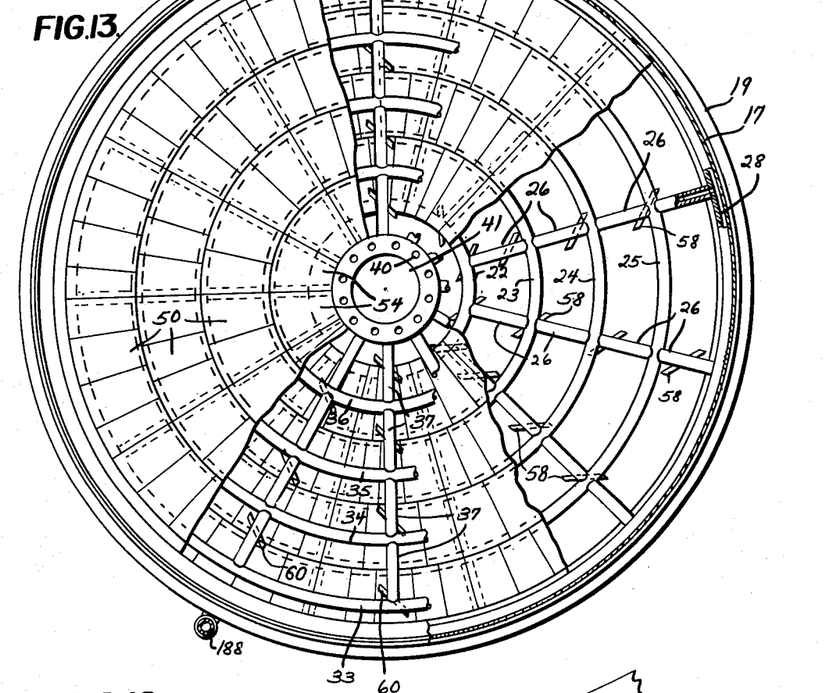
Figure 13 is a sectional view taken on the line 13—13 of Figure 9 and looking in the direction of the arrows.

It will be noted from Figure 13 of the drawings that the plates 50 are laid in such a manner that the wider portion of each plate is closer to the outer wall of the furnace and that the plates are disposed in annular concentric rows. The plates of one row are so arranged that they will break joint with the plates of the adjacent rows. The shoulders 53 of the plates 50 are substantially semi-circular in shape so that they will accommodate themselves to the rounded surfaces of the rings and bars of the hearths. The plates 50 are transversely curved to a slight extent so that the upper surface of each is slightly concave as can be seen from Figure 11 of the drawings.

Hearth plates 54 which are better shown in Figures 9 and 12 of the drawings are mounted on the rotating hearths adjacent to the rotating shaft C. Each of these hearth plates 54 has an upper portion 55 and a lower portion 56. The lower portion 56 is of less length and width than the upper portion 55 to provide a downwardly facing shoulder 57 around the entire periphery of the plate 54 for resting upon the bars and rings of the hearth B. The plates 54 are substantially oblong but as can be seen from Figures 12 and 13 of the drawings each plate 54 tapers slightly longitudinally. The edge of the narrower portion of each plate 54 is substantially semi-circular to conform to the shape of the shaft section 40 which it engages. The plates 54 are transversely curved to a slight extent so that the upper surface of each is slightly convex as can be seen from Figure 12 of the drawings.

Figure 18:
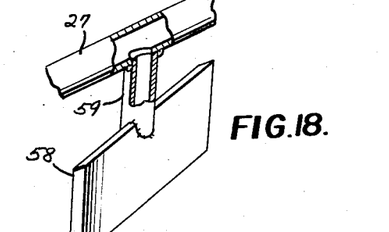
Figure 18 is a perspective view of one of the scrapers and showing its connection to a hearth with parts broken away and in section.

Plows or scrapers 58 have their shanks 59 secured as by welding or the like to the lower faces of the spokes 27. The scrapers are arranged in radially extending rows as shown particularly in Figure 13 of the drawings and are disposed at an angle of the order of forty-five degrees to the longitudinal axis of the spoke 27 to which they are attached so that the material engaging or working face of each scraper faces the passageway 49 in order to engage the material on the upper surface of the lower adjacent rotating hearth to move the material towards the passageway 49. The scrapers of adjacent radial rows are disposed in staggered relation to one another so as to make certain that all of the material on the rotating hearth will be moved into the passageway 49. The lower edges of the scrapers are spaced from the upper surface of the rotating hearth. As illustrated in Figure 18 of the drawings, the scrapers 58 may be substantially oblong.

Similarly shaped scrapers or plows 60 having shanks 61 are secured by welding or the like to the lower faces of the spokes 38 of the rotating hearths B. The scrapers 60 are arranged in radially extending rows and are disposed at substantially the same angle as the scrapers 58 but the material engaging or working faces of the scrapers 60 face the passageway 48 so as to move the material on the upper surface of the adjacent lower stationary hearth towards and into the passageway 48. The lower edges of the scrapers 60 are vertically spaced from the upper surface of the stationary hearths and the scrapers of adjacent radial rows are disposed in staggered relation to one another.

Figures 14, 15, 19:
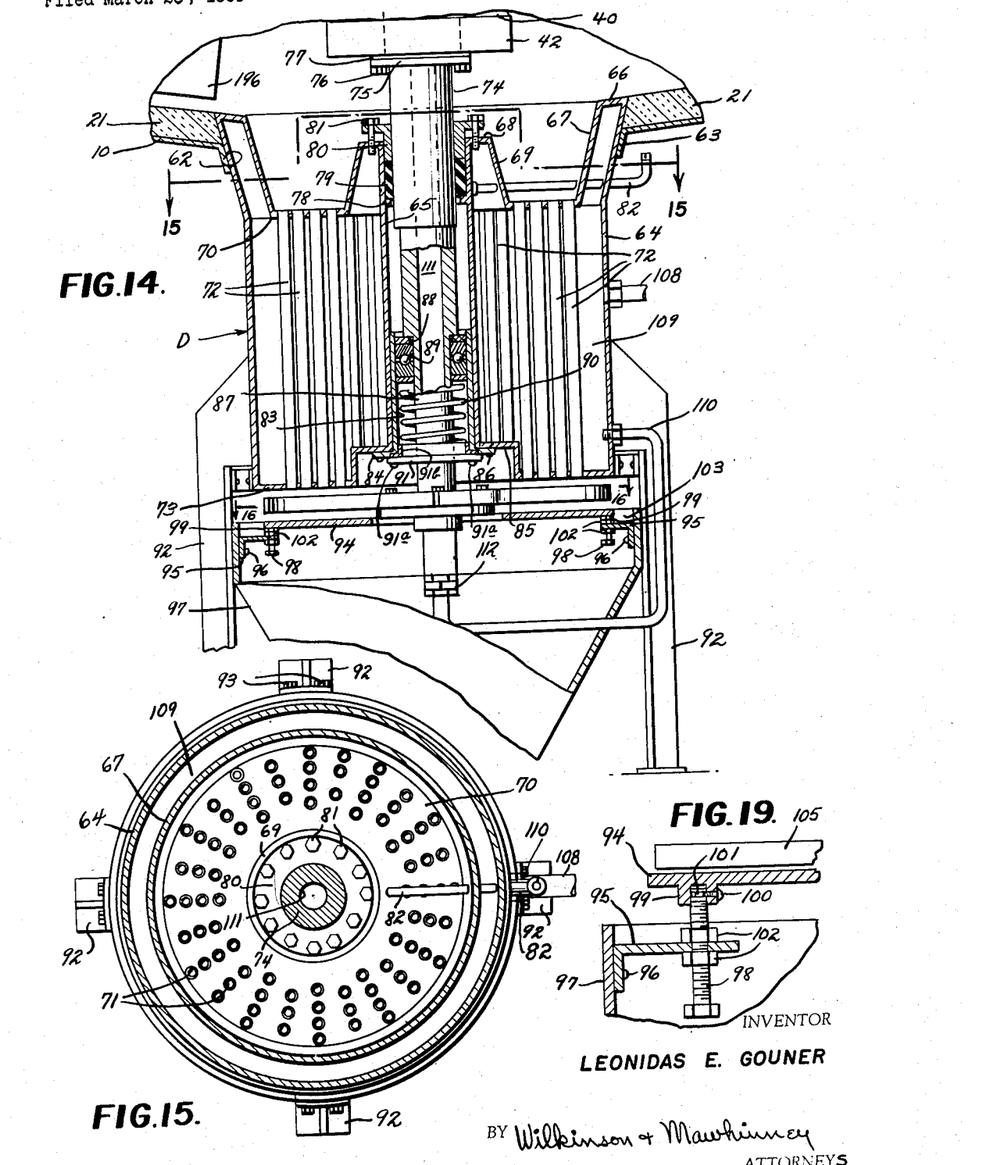
Figure 14 is a sectional view taken on the line 14—14 of Figure 1 and looking in the direction of the arrows.
Figure 15 is a sectional view taken on the line 15—15 of Figure 14 and looking in the direction of the arrows.
Figure 19 is an enlarged fragmentary sectional view of one of the adjusting screws for the discharge plate.

It will be noted from Figures 1 and 14 that the bottom 10 of the furnace has a substantially centrally disposed annular discharge opening 62 toward which the bottom slopes downwardly and inwardly. The bottom 10 has an annular downturned flange 63 which surrounds the discharge opening 62. Adjacent its upper end the outer wall 64 of a heat exchanger or cooler, generally designated D, is secured to the inner face of the flange 63 by welding or the like. The heat exchanger D may be of any desired shape and size but is illustrated as substantially circular as shown in Figure 15 of the drawings and has an inner wall 65.

The upper edge portion of the outer wall 64 is bent inwardly to form an annular flange 66, the free end of which may be formed integrally with or secured to the upper edge of the outer wall 67 of a discharge hopper. The upper edge of the inner wall 65 of the cooler terminates short of the upper edge of the outer wall 64 and is bent outwardly to provide an annular flange 68, the free end of which may be formed integrally with or secured to the upper edge of the inner wall 69 of the discharge hopper.

The discharge hopper is substantially annular in plan and V-shaped in cross-section and has a substantially flat bottom 70 provided with a plurality of spaced apart through apertures 71 for receiving the upper end portions of vertically disposed spaced apart tubes 72. The cooler D has a bottom 73 a portion of which has through apertures disposed in vertical alignment with the apertures 71 for receiving the lower end portions of the tubes 72. The tubes 72 may be secured in the aperture in any suitable manner to set up fluid tight joints therebetween.

The base 42 of the lowermost section 40 of the shaft C has a shaft extension 74 secured thereto. The upper end of the shaft extension has an outturned annular flange 75 having openings therein through which extend screws 76 or the like and the base 42 has threaded sockets for receiving the screws for securing the extension to the lowermost section 40. A washer 77 is interposed between the base 42 and the flange 75 for forming a fluid tight joint. The shaft extension 74 extends downwardly and is received by the space defined by the inner wall 65 of the cooler D.

At a short distance from its upper edge the inner wall 65 of the cooler has an inwardly extending annular flange 78 for supporting a packing 79 which embraces the shaft extension 74. For retaining the packing 79 in place a packing gland 80 is adjustably mounted on the flange 68 by adjusting screws 81. Lubricant may be introduced into the packing 79 by a pipe 82 which extends through appropriate openings in the cooler and hopper walls and is supported thereby.

A sleeve 83 is received by the lower end portion of the space defined by the inner wall 65 of the cooler and has secured to its lower end an annular plate 84 which engages the under face of a stepped up portion 85 of the bottom 73 of the cooler. The sleeve 83 is held in place by screws 86 or the like which extend through openings in the plate 84 and the portion 85 of the bottom 73.

The lower end portion 87 of the shaft extension is of reduced diameter to provide a downwardly facing annular shoulder 88 which rests upon the ball bearings 89. A coil spring 90 encircles the reduced portion 87 of the shaft extension below the bearings 89 and has its upper end engaging the under face of the bearings and its lower end supported by the plate 84 and a cap or plug 91 which is securely held in place by the plate 84 to which it is secured by screws 91a. Packing 91b may be inserted between the plate 84 and the cap 91 to form an air seal.

Supporting legs 92 are secured to the outer wall 64 of the cooler by bolts or the like 93. A distributing plate 94 is positioned below the lower ends of the tubes 72 and has a substantially centrally disposed opening through which the lower end portion of the shaft 74 extends. The plate 94 is adjustably supported by brackets 95 which may be of angle iron shape in cross-section.

The vertical flange of each bracket is secured by a rivet 96 to the inner face of the upper portion of a discharge spout 97 which is in turn supported by the legs 92, as shown in Figure 14 of the drawings. An adjusting screw 98 is threadedly received by a screw threaded opening in the horizontal flange of each bracket 95, as illustrated more clearly in Figure 19 of the drawings. One end of the screw 98 is received by a socket 99 formed on the bottom of the plate 94. A set screw 100 extends through a suitable opening in the wall of the socket 99 and has its inner end received by a circumferential groove 101 formed in the end portion of the screw 98 which is received by the socket 99. The screw 100 may be removably mounted in the wall of the socket 99. A pair of lock nuts 102 is carried by the shank of the screw 98 and one of the lock nuts is disposed on each side of the horizontal flange of the bracket 95 for binding against the opposite sides thereof for holding the set screw and the plate 94 in the desired adjusted position.

The plate 94 may be circular and has a diameter which is less than the inside diameter of the discharge spout 97 so that an uninterrupted annular discharge passageway 103 is formed between the outer peripheral edge of the plate 94 and the inner face of the discharge spout 97. A hub 104 which may be of substantially square shape is fixed to the reduced portion 87 of the shaft extension 74 for rotation therewith and is disposed above the plate 94.

Figure 16:
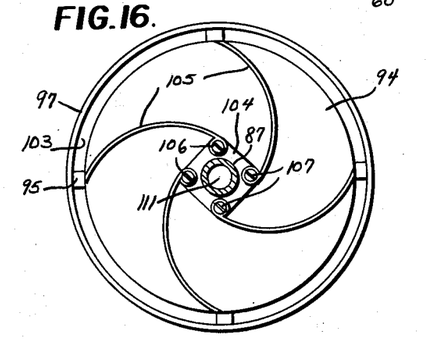
Figure 16 is a sectional view taken on the line 16—16 of Figure 14 and looking in the direction of the arrows.
Figure 17:
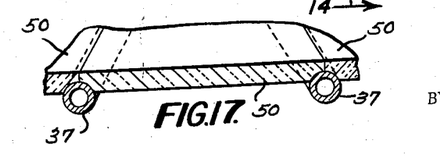
Figure 17 is a sectional view taken on the line 17—17 of Figure 3 and looking in the direction of the arrows.

A plurality of sweep arms 105 each has an eye 106 at its inner end through which extends a screw 107 or the like for securing the arms 105 to the hub 104. The eyes 106 may be secured to the hub 104 at substantially each of the four corners of the hub, as clearly illustrated in Figure 16 of the drawings. Each arm 105 is of substantially arcuate shape and is disposed vertically above and in slightly spaced apart relation to the upper face of the distributing plate 94. The free end of each arm terminates at substantially the outer peripheral edge of the plate 94 and the concave surface of each arm faces in the direction of rotation of the arms 105 so that upon rotation of the arms the material which has been deposited upon the plate 94 by the tubes 72 is swept outwardly towards and into the passageway 103.

A water inlet 108 which may be connected to a suitable source of water supply is mounted in the outer wall 64 of the cooler D and communicates with the interior space 109 of the cooler. Adjacent the bottom of the cooler the outer wall 64 has mounted therein an outlet pipe 110, one end of which communicates with the space 109 and the other end of which communicates with a through bore 11 formed in the shaft extension 74 and the reduced portion 87 thereof. The end of the pipe 110 which communicates with the bore 111 of the shaft extension 74 is connected to the lower end of the portion 87 of the shaft by a swivel joint 112 which permits rotation of the shaft without disturbing the connection between the pipe 110 and the shaft.

The upper end of the furnace is closed by a top 113 which may be made of steel and is strengthened by upstanding angularly spaced apart ribs 114. The top 113 has an annular depending skirt 115 for frictionally engaging the outer face of the upper portion of the wall section 18 of the furnace. A housing 116 which may be substantially cylindrical in shape is supported by the top 113. The lower end of the housing 116 may be formed integral with the top 113 or may be secured thereto as by welding or the like. The upper end of the housing 116 is closed by a cover 117 which has a depending skirt 118 for frictionally gripping the outer face of the upper end portion of the housing 116.

A plurality of stiffeners or ribs 119 are secured to the under face of the cover 117 in spaced apart angular relation to one another. The upper portion of the shaft C tapers upwardly as indicated at 120 and the upper end portion 121 of the shaft is of reduced diameter and extends upwardly through a suitable opening in the cover 117 and terminates above the cover 117.

A bearing housing 122 encircles the upper portion 121 of the shaft and is fixed to the cover 117 by welding or the like. The housing 122 supports the bearings 123 which in turn supports the shaft C. A gear 124 surrounds the upper end of the shaft portion 121 and is secured to the shaft portion by screws 125 or the like which extend through an annular flange 126 of the shaft portion and are received by suitable threaded sockets on the hub of the gear 124. A worm gear 127 which is in mesh with the gear 124 is carried by a shaft 128 which is mounted in a pair of spaced brackets 129 supported by the cover 117.

Adjacent its outer edge the cover 117 has an opening through which extends a sleeve 130 having an annular flange 131 which is secured to the upper face of the cover 117 by screws or the like 131a for maintaining the sleeve 130 in its proper position. The neck 132 of a hopper 133 is slidably received by the sleeve 130. The hopper 133 is mounted for vertical adjustment upon a plurality of adjusting screws 134. Each adjusting screw is threadedly received by a threaded opening 135 formed in an arm 136 which is secured to the hopper by welding or the like.

The screws 134 have enlarged heads 137 which are received by sockets formed in the bosses 138 which are provided on the cover 117 and also on the horizontal flange of a bracket 139 supported by the skirt 118 of the cover 117. A plate 140 is secured to each of the bosses 138 by screws 141 or the like. Each plate 140 has an opening of a diameter to permit the shank of the screw 134 to pass therethrough but which will not permit the head 137 to escape from the socket in the boss 138.

Each screw 134 has a hexagonal shape portion 142 adapted to be engaged by a wrench or other tool for turning the screw 134.

A hub 143 has an upwardly tapered opening for receiving the tapered portion 120 of the shaft C so that the hub will have a drive fit with the shaft portion 120. The hub 143 has extending outwardly therefrom a plurality of apertured ears 144 which are disposed in spaced apart angular relation to one another. The ears are attached to the lower inner end portions of bracket arms 145 by rivets 146 or the like. From their points of attachment to the ears 144 the intermediate portions of the arms 145 extend upwardly and outwardly and are secured as by welding or the like to the outer face of a rotatable cone-shaped distributor 147.

The upper outer end portions 148 of the arms 145 are inclined upwardly and outwardly above and beyond the upper edge of the distributor and are secured by welding or the like to the under face of a rotatable circular receiving plate 149. The plate 149 is capable of rotation beneath the discharge neck 132 of the hopper 133 for receiving material therefrom and the plate is inclined downwardly and inwardly so as to discharge the received material into the distributor 147 to the upper edge of which the inner edge of the plate 149 may be attached or formed integrally therewith.

Figure 5:
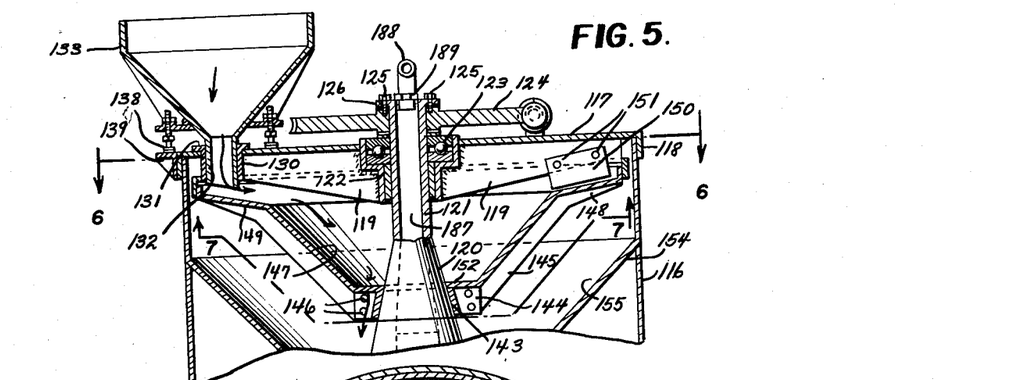
Figure 5 is a sectional view taken on the line 5—5 of Figure 2 and looking in the direction of the arrows.
Figures 6, 7, 8:
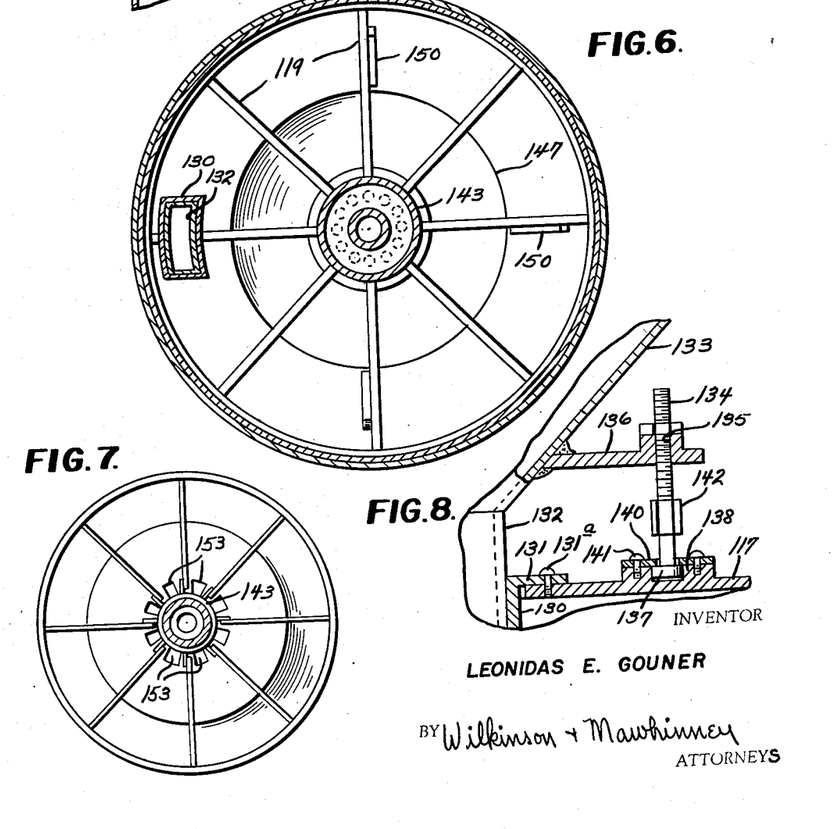
Figure 6 is a sectional view taken on the line 6—6 of Figure 5 and looking in the direction of the arrows.
Figure 7 is a sectional view taken on the line 7—7 of Figure 5 and looking in the direction of the arrows.
Figure 8 is an enlarged fragmentary sectional view of one of the hopper adjusting screws.

For the purpose of assisting the discharge of the material being treated from the plate 149 into the distributor, plows 150 may be secured to some of the stiffeners 119 by rivets 151 or the like. As is shown in Figures 5 and 6 of the drawings the plows 150 extend longitudinally across the plate 149 and have their lower edges slightly spaced above the upper face of the plate. The bottom 152 of the distributor 147 has a plurality of angularly spaced apart discharge openings 153.

Figures 2, 3, 4, 20:
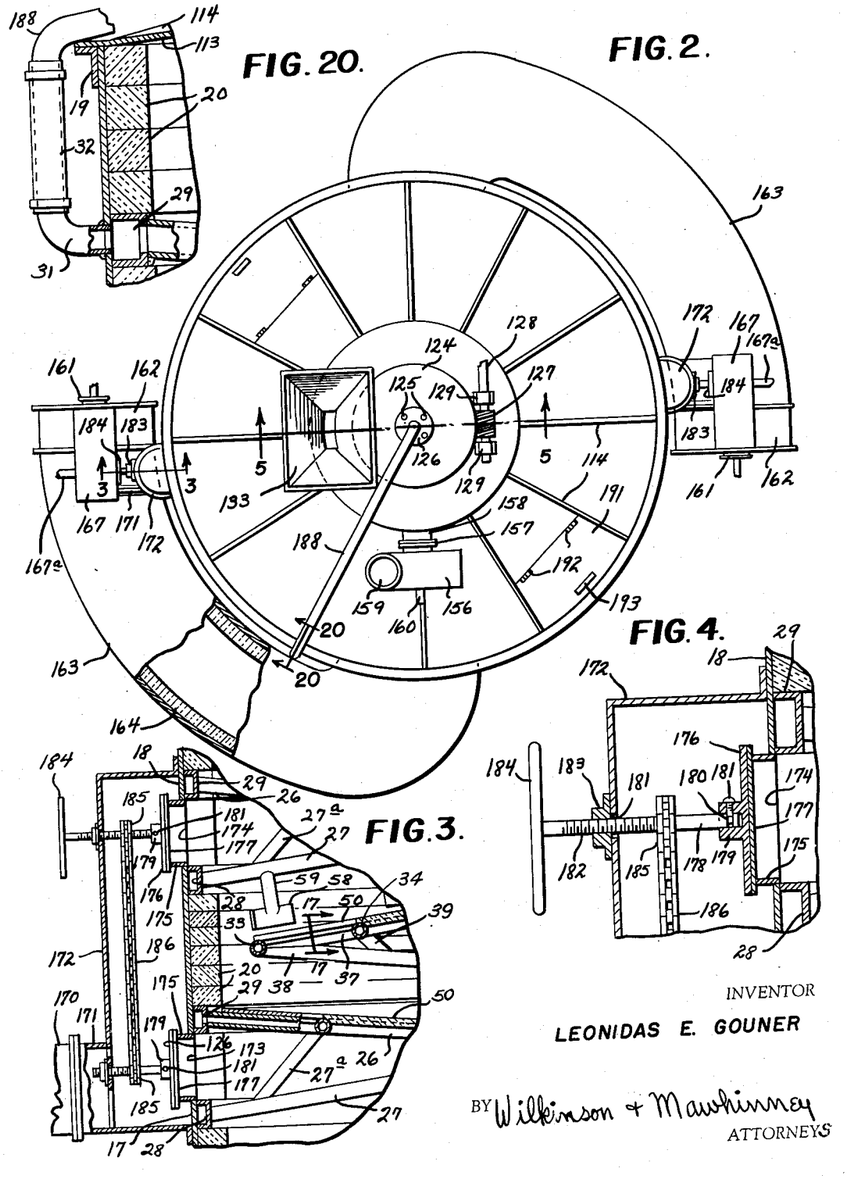
Figure 2 is a top plan view with parts broken away.
Figure 3 is a sectional view taken on the line 3—3 of Figure 2 and looking in the direction of the arrows.
Figure 4 is an enlarged fragmentary sectional view of the upper portion of Figure 3 illustrating one of the valves in greater detail.
Figure 20 is a sectional view taken on the line 20—20 of Figure 2.

A baffle plate 154 which may be cone-shaped or any other desired shape is supported at its lower end by the top 113 to which it may be secured and its upper end may be attached to the inner face of the housing 116. The baffle plate 154 is disposed in spaced apart substantially parallel relation to the distributor 147 so that a substantially annular duct 155 is formed between the baffle and the distributor through which an induced or suction fan 156 can remove furnace gases, vapors and excess air from the upper part of the furnace. The fan 156 is connected as at 157 to the duct 155 by a pipe 158 as is shown in Figure 2 of the drawings and has an outlet 159 for connection to a chimney or exhaust stack for discharging the gases into the outside atmosphere. The drive shaft of the fan 156 is indicated at 160.

For the purpose of supplying heat to the furnace, a conventional type burner 161 which may be either of the gas or oil fired type, and having the conventional controlled air inlets to support combustion is mounted in each of manifolds 162 which are suitably supported by combustion chambers 163. The combustion chambers 163 may be of any desired size and shape but are shown in Figures 1 and 2 of the drawings to be substantially round in cross-section and of elongated arcuate shape to conform to the contour of the outer wall of the furnace. The combustion chambers may be lined with fire brick 164 and are supported in substantially the same horizontal plane at diametrically opposite sides of the furnace by gussets 165 which in turn are supported by the outer wall of the furnace. The manifolds 162 are mounted on the outer free ends of the combustion chambers and the combustion chambers extend from the manifolds in opposite directions to one another and their inner end portions communicate with the interior of the furnace at substantially diametrically opposite locations through openings 166 formed in the sections 15 and 16 of the side wall of the furnace.

In order to control the temperature within the furnace, the cooler gases are withdrawn from the upper portion of the furnace and re-circulated to the combustion chambers 163 by a pair of suction or induced fans 167 one of which is associated with each of the manifolds 162. Each fan has a drive shaft 167a. The lower end of each fan is connected as at 168 to a pipe 169 which communicates with its manifold 162. Adjacent its upper end each fan has a nipple 170 which is connected to a nipple 171 carried by a header or manifold 172. The nipples 171 communicate with the interior of the headers 172. The headers may be of any desired shape but in the present illustration are shown to be substantially semi-circular in cross-section and vertically elongated. The headers 172 are secured as by welding or the like to the outer face of the sections 17 and 18 at substantially diametrically disposed points as is shown in Figure 2 of the drawings. Openings 173 and 174 are formed in the sections 17 and 18, respectively at opposite sides thereof so as to place the interior of the headers 172 in communication with the interior of the furnace.

A valve seat 175 is positioned in each of the openings 173 and 174 and extends outwardly of the side wall of the furnace and projects into the header 172. A valve head is associated with each valve seat and comprises a rigid plate 176 which may be of metal or other suitable material and a flexible element 177 attached to the plate and which may be of steel, asbestos or other suitable material. The valve plate 176 is mounted on the inner end of a valve stem 178. The inner end portion of the valve stem is received by a recessed boss 179 formed on the outer face of the valve plate and has an annular groove 180 therein for loosely receiving the end of a set screw 181 movably carried by a side wall of the boss 179 so that the valve plate 176 may be moved towards and away from its seat 175 without rotating the valve plate.

The valve stem extends outwardly through a smooth bore opening 181 formed in the side wall of the header 172. The valve stem has an intermediate screw threaded portion 182 which is received by a nut 183 carried by the side wall of the header 172 and the threaded bore of which is in alignment with the opening 181 in the header. A hand wheel 184 is carried by the outer free end of the upper valve stems. The lower valve stems 178 are similar to the upper valve stems except they do not have hand wheels thereon as the outer ends of the valve stems are disposed within the nipples 171 and are not readily accessible. For the purpose of rotating the lower valve stems, all of the valve stems 178 have a sprocket wheel 185 thereon and a sprocket chain 186 is trained over the sprocket wheels of an upper and a lower valve stem.

The tapered portion 120 and the upper portion 121 have a bore 187 which communicates at its lower end with the bore 111 of the shaft C and at its upper end with one end of a pipe 188 which is connected to the upper end of the shaft portion 121 by a swivel connection 189. The pipe 188 extends radially outwardly to clear the side wall of the furnace and then downwardly alongside of the side wall of the furnace and is connected to the uppermost header 29. A discharge pipe 190 has one end connected to the lowermost header 28 and its other end adapted to empty into any suitable disposal means.

The top 113 has a pair of trap doors 191 which normally mask entrance openings in the top 113 disposed at substantially diametrically opposite points. Each door 191 is hinged at 192 to the top and has a handle 193 by which the door may be raised and lowered.

The under face of the top 113 has secured thereto shanks 194 of plows 195 which are similar in structure and arrangement to the plows 58 and cooperate with the uppermost rotating hearth B. The plows 196 which are carried by the lowermost rotating hearth B cooperate with the fire brick 21 on the bottom 10 of the furnace. The plows 196 are similar in structure and arrangement to the plows 60 except that there are only three plows 196 in each radial row and there are four plows 60 in each radial row.

In the operation of the device the shaft C is driven by the gear 124, which in turn is rotated by the worm 127. The worm shaft 128 is connected to any suitable source of power. The rotation of the shaft C will cause the hearths B to rotate in a counterclockwise direction when looking down on the device as in Figure 2 of the drawings. The rotation of the shaft C will also cause the receiving plate 149 and the distributor 147 to rotate in a counterclockwise direction when looking down on the device as in Figure 2 of the drawings. The material to be treated in the furnace is placed in the feed hopper 133 and the material will be fed from the hopper through the neck 132 and deposited upon the receiving plate 149. Due to the downward and inward inclination of the plate 149 the material received thereby will fall by gravity into the distributor 147.

This movement of the material from the plate 149 will be assisted by the plows 150 as the plate rotates therebeneath. The material will pass downwardly and inwardly over the downwardly and inwardly sloping walls of the distributor 147 and will pass through the discharge openings 153 in the bottom of the distributor and will fall upon the upper surface of the uppermost rotating hearth B.

Since the upper surface of the rotating hearth is inclined downwardly and outwardly towards the annular passageway 49, the material thereon will move by gravity towards the passageway 49. This movement of the material will be augmented by the action of the stationary scrapers 195 so that all of the material will be moved from the uppermost rotating hearth into the passageway 49 from which it will fall upon the upper surface of the first stationary hearth A.

Since the upper surface of the stationary hearth is inclined downwardly and inwardly towards its passageway 48, the material will gravitate towards said passageway. The scrapers 60 which are carried by and depend from the uppermost rotating hearth B will cooperate with the inclined upper surface of the adjacent stationary hearth A to assist in moving the material towards and into the passageway 48. The material will flow through the passageway 48 and be deposited upon the upper surface of the next adjacent rotating hearth B.

The above described movement of the material will be continued throughout the remainder of the hearths until the material reaches the fire brick 21 of the bottom 10 of the furnace. The material will be moved inwardly and downwardly over the fire brick 21 and fall into the discharge hopper 67. From the discharge hopper the material will fall through the tubes 72 and be received by the distributing plate 94. The amount of material deposited upon the plate 94 may be controlled by the vertical adjustment of the plate 94 towards and from the lower ends of the tubes 72 by the adjusting screws 98. The material is swept from the upper surface of the plate 94 by the sweep arms 105 which are rotated in a counterclockwise direction by the shaft C when looking down on the device. The material will be moved by the arms 105 into the annular passageway 103 from which it will fall by gravity into the discharge spout 97. The material from the discharge spout 97 may be deposited into any suitable receptacle.

It will be noted from the above described action that the material to be treated flows in a downward zigzag path throughout substantially the entire height and horizontal area of the furnace so that the material to be treated is subjected to substantially the entire range of temperatures which prevail in different portions of the furnace. It will be also noted that the material passageways are continuous and uninterrupted so that there is no likelihood of any portion of the material to lag behind or accumulate in any part of the furnace. Moreover, the passageways are not formed in the hearths so that the structure of the hearth is not weakened.

As can be seen particularly from Figures 1 and 2 of the drawings, the heated gases from the burners 161 enter the furnace through the openings 166 with a swirling movement in a counterclockwise direction from opposite sides of the furnace wall. This manner of introducing the heated gases into the furnace will make certain that the gases will circulate to the entire cross-sectional area of the furnace. The heated gases will pass upwardly in a zigzag manner through the inner passageways 48 and the outer passageways 49 in a counter direction to the descending material to be roasted. The alternate arrangement of the passageways 48 at substantially the horizontal center of the furnace and the passageways 49 adjacent the side wall of the furnace will make certain that the heated gases during their upward flow come into contact with every portion of the material to be treated so that all of the material will be properly roasted.

The fan 156 when in operation will suck the furnace gases, vapors and excess air from the upper part of the furnace through the duct 155 and the pipe 158 and exhaust the gases through the outlet 159. This exhausting action of the fan 156 tends to create a partial vacuum which lessens or prevents the burning of the material being treated and results in a more uniform and better product.

In order to keep the heated gases in the furnace within the proper temperature range required for the material being treated and the results desired, the fans 167 will be set in operation. The valves 176 will be opened the desired amount so that the fans 167 will draw the cooler gases from the upper part of the furnace through the openings 173 and 174 and the headers 172 and into the manifolds 162. These lower temperature gases will be forced by the fans 167 through ports 197 formed in the inner end walls 198 of the manifolds 162 into the combustion chambers 163 where they will commingle with the hotter gases from the burners 161 to lower the temperature of the hotter gases.

This temperature control is especially desirable in a substantially air-tight system such as is disclosed in the present invention, since burning oil or gas, with no excess air creates very high temperatures. The conventional air inlet openings of the burners 161 may be regulated to admit only sufficient air to support combustion of the fuel oil or gas or they may be opened sufficiently to supply air to the furnace when treating material which requires oxygen in its treatment, such as certain ores.

The temperature is controlled by the amount of the re-circulated furnace gases. This process is provided because the initial combustion is accomplished with a minimum of excess air, in order to reduce the amount of oxygen which enters into the roasting furnace. Excess oxygen in the roasting furnace would result in combustion or burning of the product, or part thereof, and the re-circulating and mixture of the cooler upper furnace gases with the hotter combustion chamber gases provides for the controlled cooling of the furnace gases which enter the oven, but without introducing fresh oxygen into the roasting furnace.

The operation of the cooling system is as follows:
Cooling water is introduced through the pipe 108 into the space 109 of the cooler D where it surrounds the tubes 72 through which the material being treated passes. The cooler water flows from the lower portion of the space 109 through the pipe 110 into the lower end of the bore 111 of the shaft extension 74. The water will move upwardly into the bore 41 and then flow through the conduits 46 of the base 42 of the lowermost section 40 of the shaft C. From the conduits 46 the water will enter the hollow spokes 38 of the lowermost rotating hearth B and from the outer ends of the spokes the water will be moved into the outermost hollow ring 33 and outermost bars 37.

The water will pass from the ring 33 into the hollow bars 37 and the hollow rings 34, 35 and 36 and through the innermost bars 37 into the conduits 47 of the enlarged portion 42a of the lowermost section 40. From the conduits 47 the water will re-enter the bore 41 of the lowermost section 40 and will be moved upwardly into the bore 41 of the adjacent upper section 40 and will circulate to the next upper rotating hearth in the same manner as described above for the lowermost rotating hearth. In this manner the cooling water will be moved upwardly through each of the rotating hearths to cool the hearths and the material thereon.

The water will pass from the upper end of the bore 41 into and through the bore 187 of the shaft portions 120 and 121 and into the pipe 188 through which it will flow downwardly to the uppermost header 29. The water will flow from the header 29 into the outermost hollow bars 26 of the uppermost stationary hearth. From the outermost bars 26 the water will circulate through the other bars 26 and the hollow rings 22, 23, 24 and 25. The water will then flow from the innermost ring 22 and the innermost bars 26 into the inner end portions of the hollow spokes 27 through which the water will flow into the adjacent header 28. The water will be conducted by the L 30 and 31 and the tube 32 into the next lower header 29 from which the water will be circulated through the next lower stationary hearth in the same manner as described above. In this manner the cooling water will flow downwardly through all of the stationary hearths and will be conducted from the lowermost head 28 by the pipe 190 to a suitable disposal point.

When it is desired to clean the interior of the furnace or to make repairs, access may be had to the interior of the furnace by opening one or both of the trap doors 191 and removing as many of the hearth plates 51 from the hearths A and B as will be necessary to permit the workman to reach the various parts of the furnace requiring attention.

The opening in the cover 117, the sleeve 130 and the neck 132 of the hopper 133 may be non-circular in cross-section, as shown in Figure 6 of the drawings, to prevent rotation of the hopper 133. While the neck 132 is fitted in the sleeve 130 to permit the hopper to be raised and lowered by the adjusting screws 134 to control the flow of material to the plate 149, the fit will be sufficiently close to reduce air leakage to a minimum.

The greater part of the weight of the shaft C is carried by the bearing housing 122 and the bearings 123, but the coil spring 90 also bears part of the weight of the shaft and permits expansion of the shaft due to heat from the furnace.

Any desired number of furnace casing sections and hearths may be used. The improved furnace may be used to dry and revivify or reactivate bone char or the like. The downward inclination of the hearths towards the material passageways is especially helpful in preventing the pulverizing of the material when bone char is the material being treated.

As the hearths B rotate, the scrapers of both the stationary and rotating hearths will not only move the material being treated over the entire upper surface of the hearths but will also turn the material over so that all sides of material will be subjected to the various heat conditions prevailing in different parts of the furnace.

It is obvious that various changes and modifications may be made in the details of construction and design of the above specifically described embodiment of this invention without departing from the spirit thereof, such changes and modifications being restricted only by the scope of the following claims.

What I claim is:

1. A furnace for roasting material comprising an air-tight casing, a stationary hearth in said casing, a second hearth rotatably mounted in said casing and operatively associated with said first hearth, material feeding and distributing means on the casing for depositing the material upon one of the hearths, a passageway within the casing for conducting the material from said one hearth to the other of said hearths, a cooler on the casing for receiving the material from said other hearth and having a material discharge control device, two sources of heating gases disposed at substantially diametrically opposite sides of the casing and each comprising a combustion chamber having its inner end opening into said casing, a manifold on the outer end of the combustion chamber, a burner in said manifold, said casing having openings therethrough in the upper portion thereof, a header on the casing and having its interior in communication with said openings, a valve for controlling each of said openings, and a suction fan connected to said header and manifold for withdrawing the cooler gases through said openings and introducing them into the manifold and combustion chamber where they will commingle with the hotter gases from the burner to reduce the temperature of the hotter gases.

2. A furnace for roasting material comprising a casing, a stationary hearth in said casing, a second hearth rotatably mounted in said casing and operatively associated with said first hearth, material feeding and distributing means on the casing for depositing the material upon one of the hearths, a passageway within the casing for conducting the material from said one hearth to the other of said hearths, a cooler on the casing for receiving the material from said other hearth and having a material discharge control device, a source of heating gases, a suction element for causing said heating gases to contact the material, means for conducting the material from said other hearth to the cooler, said cooler comprising a discharge hopper having a bottom for receiving the material from the conducting means, a pair of walls defining a cooling fluid receiving space and cooperating with the hopper to close said space at the top thereof, a bottom wall for closing said space at the bottom thereof, the bottom of said hopper and said bottom wall having apertures therethrough, a plurality of tubes positioned in spaced apart relation in said space and having their opposite end portions received by said apertures for receiving the material from the hopper and for discharging it from the cooler.

3. A furnace for roasting material comprising a casing, a stationary hearth in said casing, a second hearth rotatably mounted in said casing and operatively associated with said first hearth, material feeding and distributing means on the casing for depositing the material upon one of the hearths, a passageway within the casing for conducting the material from said one hearth to the other of said hearths, a cooler on the casing for receiving the material from said other hearth and having a material discharge control device, a source of heating gases to contact the material, a shaft for rotating said second hearth, said material feeding and distributing means comprising a feed hopper on the casing for receiving the material, a plate for receiving the material from the hopper, and a distributor for receiving the material from said plate and depositing it upon said one hearth, said distributor and plate being mounted for rotation by said shaft.

4. A furnace for roasting material comprising a casing, a series of rotatable hearths in said casing, a series of stationary hearths in said casing, said rotatable and stationary hearths being arranged in alternate sequence, material feeding means for depositing the material upon the first of said hearths, means for rotating the rotatable hearths, each hearth of one series having an outer free edge, each hearth of the other series having an inner free edge, a passageway beyond the outer edge of each hearth of said one series of hearths for conducting the material from the hearths of said one series of hearths to the next lower hearth of the said other series of hearths, a second passageway beyond the inner edge of each hearth of said other series of hearths for conducting the material from the hearths of said other series to the next lower hearth of the one said series, the material receiving surfaces of said hearths being of substantially equal areas and each hearth of one series being arranged in vertically spaced apart overlapping relation with the adjacent hearth of the other series throughout substantially their entire areas, the material receiving surface of each hearth being inclined downwardly towards its passageway to facilitate the movement of the material over said surface towards the free edge thereof and into its passageway, and means for introducing heat into said casing adjacent one end thereof so that the heat will travel through said passageways and the spaces between the adjacent hearths.

5. A furnace for roasting material comprising a circular casing, a cooler communicating with the interior of said casing, a drive shaft in the casing, supporting means on the cooler for the lower end portion of said shaft, a series of hearths mounted on said shaft for rotation therewith and having their outer free edges spaced inwardly from the casing to provide a drop space, a series of stationary hearths having their outer edges secured to said casing and having substantially centrally disposed openings encircling the shaft and having the edges of said openings spaced from said shaft to provide drop spaces therebetween, a top on the upper end of the casing having a material receiving opening therein, a cylindrical housing on said top and surrounding the opening in the top, a cone shaped baffle plate on said top and within said housing, a cone shaped distributor mounted on said shaft for rotation therewith, a receiving plate on said distributor, a cover on the upper end of said housing and having an aperture therein, a material feed hopper having a neck slidably received by said aperture for feeding the material to be treated to the receiving plate, means for changing the distance between said neck and said receiving plate to control the feeding of the material to the receiving plate, a bearing mounted on said cover for supporting the upper end portion of said shaft, means for rotating said shaft, and heating means for roasting the material.

6. A furnace for roasting material comprising an air-tight casing, a drive shaft rotatably supported by and within said casing and having a through longitudinally extending bore, a series of rotatable hearths mounted on said shaft for rotation therewith, a series of stationary hearths mounted within said casing, the rotatable and stationary hearths being alternately arranged, means for supplying a cooling fluid to said bore, each of said rotatable hearths comprising a hollow frame having communication with the bore of said shaft for receiving cooling fluid therefrom for circulation through the hollow frame and also having communication with the bore of said shaft to return the fluid to said bore, each of said stationary hearths comprising a hollow frame, means for supplying a cooling fluid to one of said stationary hearths for circulation through the hollow frame thereof, and conduit means connecting the adjacent stationary hearths for conducting the cooling fluid from one stationary hearth to the next adjacent stationary hearth, the hollow frame of each rotatable hearth and each stationary hearth comprising a plurality of substantially concentric annular members of progressively increasing diameters, elements connected to said members for maintaining the members in spaced apart relation and in horizontal planes of progressively higher elevation, and hearth plates removably supported by said members and elements to provide a sloping material receiving surface, said members and elements being hollow and interconnected to provide a cooling fluid receiving conduit, material feeding and distributing means on the casing for supplying the material to the first of the rotatable hearths, a zigzag passageway within the casing for conducting the material in one longitudinal direction through the casing from hearth to hearth beginning with said first hearth and ending with the last hearth, a cooler positioned on the casing for receiving the material from said last hearth and having a material discharge control device, a source of heating gases, and a suction element for causing said heating gases to flow through said passageway in a longitudinal direction opposite to that of the material for contacting the material, removing furnace gases, vapors and excess air from the upper part of the furnace.

References Cited in the file of this patent

UNITED STATES PATENTS

| Number | Name | Date |
|---|---|---|
| 1,114,372 | Laist | Oct. 26, 1914 |
| 1,164,187 | Hovland | Dec. 14, 1915 |
| 1,549,379 | Pike | Aug. 11, 1925 |
| 1,671,395 | Baird | May 29, 1928 |
| 2,030,734 | Baird | Feb. 11, 1936 |
| 2,333,111 | Lykken | Nov. 2, 1943 |

FOREIGN PATENTS

| Number | Country | Date |
|---|---|---|
| 26,736 | Great Britain | 1913 |
| 332,226 | Great Britain | 1930 |